Jan. 21, 1969 M. NIEDEREDER 3,423,678
CIRCUIT ARRANGEMENT FOR FREQUENCY MARKER GENERATION
Filed July 8, 1964

United States Patent Office 3,423,678
Patented Jan. 21, 1969

3,423,678
CIRCUIT ARRANGEMENT FOR FREQUENCY
MARKER GENERATION
Martin Niedereder Munich-Solln, Germany, assignor to Siemens Aktiengesellschaft, a corporation of Germany
Filed July 8, 1964, Ser. No. 381,158
Claims priority, application Germany, July 10, 1963,
S 86,086, S 86,087
The portion of the term of the patent subsequent to Dec. 25, 1984, has been disclaimed and dedicated to the Public
U.S. Cl. 324—77   5 Claims
Int. Cl. G01r 23/16; 27/02

ABSTRACT OF THE DISCLOSURE

A circuit arrangement for the generation of frequency markers in a measuring receiver constructed to display the frequency characteristic of an object to be measured, in which a signal generator output voltage fed to the object is controlled as to its frequency by a further generator, having a feedback branch in which is disposed switching means, comprising an anti-parallel circuit having two rectifiers, for the control of the marker generator, the output voltage of the second mentioned generator and a reference voltage being supplied to the switching means whereby upon amplitude equality between such voltages marker impulse is produced by said marker generator.

---

Figure 1:
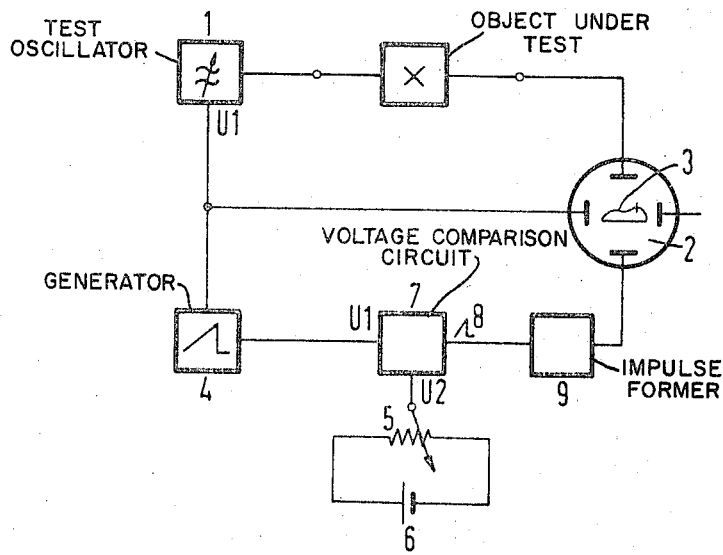

In the known measuring receivers with frequency curve display of a measuring magnitude, such as, for example, image display devices or curve recorders utilizing a cathode ray tube as the display or indicating means, the frequency markers to be inserted are, in general, provided in a manner such that the wobbled measuring frequency is mixed with a fixed, adjustable reference frequency and the differential between the two is filtered out over a low pass filter with a low limit frequency or a band filter with narrow pass range. If the measuring frequency agrees approximately with the fixed reference frequency or deviates from this by a fixed amount given by the band filter, there then arises in each case voltages which can be utilized for the generation of frequency markers. It is thus possible, for example, to use these voltages, possibly following rectification thereof, for the additional deflection of the electron beam of the cathode ray tube, or employ them to effect the release of an impulse generator which accomplishes an intensity control of the electron beam.

Here it is disadvantageous that the frequency marker control extends over a low pass filter or a band filter, especially in the case of small wobble sweeps, as the filter vibration period would in such case normally involve a sufficiently small wobbling speed. If, for example, with a wobble sweep of 100 c./sec., the width of the visible frequency marker is chosen at 1% of the sweep, that is, at 1 c., then the build-up time of an unsteepened filter employed amounts, as reciprocal value of the band width, to 1 second. This means that the total wobble sweep here has to be run through in 100 seconds or more, which corresponds to a wobble frequency of 0.01 c./sec. If one avoids such extremely low wobble frequencies, which permit practically no evaluation by means of cathode ray oscillographs, by utilizing wider frequency markers of more than 1% of the sweep, there results, on the one hand, inaccuracies in the frequency reading, while on the other hand, the frequency curve to be represented is more extensively covered over by the frequency markers, so that its readability suffers.

The present invention relates to a circuit arrangement for the generation of frequency markers in a measuring receiver which contains a device for the plotting or displaying of the frequency characteristics of an object to be measured in two coordinates, consisting of two deflection systems, respectively allocated to the coordinates, of a display device, of which the first deflection system is influenced by a voltage which is proportional to the amplitude of the output voltage of the object to be measured, while the second deflection system is connected with a generator whose output voltage is related in its amplitude to the frequency of the output voltage of the object to be measured, and a voltage comparison circuit, to the inputs of which the output voltage of said generator and a reference voltage with adjustable amplitude are connected, and which upon amplitude equality therebetween, generates an output which is fed as a frequency marker impulse to the display device.

Important advantages of the invention lie in the features that the wobble voltage of the measuring generator or the time deflection voltage of the measuring receiver are available without any further circuit technology expenditure for comparison with an adjustable reference voltage, and on the other hand, have a sufficient amplitude for the exact definition requirement of the marker time point and also for the generation of a sufficient pulse height of the frequency marker impulse.

Figure 2:
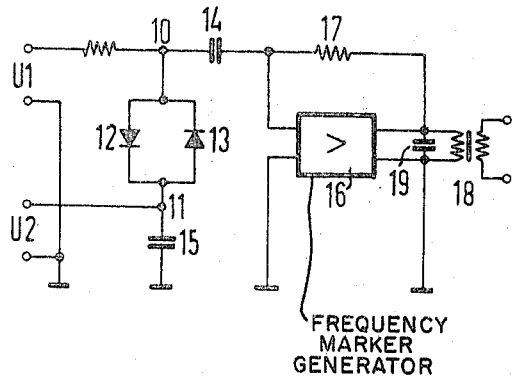

Further features and advantages of the switching arrangement according to the invention will be apparent from the following description of a preferred example of construction represented in the drawings in which:

FIG. 1 illustrates a measuring device consisting of a measuring transmitter and a measuring receiver, which utilizes a cathode ray tube as indicating a display means; and FIG. 2 illustrates an example of an advantageous circuit for that portion of the circuit schematically represented in FIG. 1, which is designated as the voltage comparison device.

The measuring station represented in FIG. 1 contains a test oscillator 1, which is continuously and, in particular, automatically adjustable (automatically wobbled) as to its frequency, and a measuring receiver with a cathode ray tube 2 as the indicating or display member. Here, in a known manner, the frequency characteristic 3 of an interposed object X, which is to be measured, is represented on the picture screen of the tube 2, in which arrangement a generator 4, which, for example, feeds a sawtooth-shaped wobble voltage to the measuring transmitter 1 and correspondingly frequency-modulates the latter, simultaneously supplies the horizontal scanning deflection voltage for the cathode ray tube 2. The voltage appearing at the output side of the object X is fed therefrom to the vertical deflection system.

For the generation of a frequency marker in the freqency curve representation, the output voltage U1 of generator 4, together with an adjustable reference voltage U2 which is illustrated as derived over a potentiometer 5 from a battery 6, is supplied to the inputs of a voltage comparison circuit 7, which, in a manner known per se, delivers an output impulse 8 on occurrence of equal amplitudes of the two voltages. This may be transformed, in a subsequent impulse former stage 9, into a rectangular impulse of suitable height and width and, as a frequency marker impulse, is fed to the vertical deflection device of the cathode ray tube 2. The frequency marker impulse, instead of such arrangement, may also be fed to the intensity control electrode of the cathode ray tube 2, where it will produce a light and dark scanning of the frequency curve 3 represented at the point to be marked. The magnitude of the voltage U1 delivered by generator 4 is here sufficient to generate in the voltage comparison circuit 7 an output impulse 8, having an impulse level such that, without use of additional amplification means, a frequency marker impulse of sufficient amplitude can be formed.

In the following there is described in detail an example of a circuit for the voltage comparison device 7 represented in FIG. 1.

Referring to FIG. 2, it will be assumed that the direct potential U1, applied to the left upper pair of terminals, has an amplitude which is clearly related to the measuring frequency present in each case. Potential U1 may be derived in a known manner from the wobble voltage, for example, over a differentiating member, an integrating member, a discriminator or a frequency meter, while the potential U2, fed to the left hand lower pair of terminals, is an adjustable reference voltage. If U1 now reaches a certain amplitude corresponding to the magnitude of U2, the circuit points 10 and 11 will be at the same potential. The anti-parallel circuit connected between 10 and 11 of the two rectifiers 12 and 13 has, in this case, a very great bi-pole resistance. If on the other hand, U1 deviates from U2 in an amount greater than the threshold value potential of the rectifiers 12, 13 with U1>U2 the rectifier 12 is low ohmic, while with U1<U2 the rectifier 13 is low ohmic.

The anti-parallel circuit lying between 10 and 11 of the rectifiers therefore functions as a switch which is controllable in a high or low ohmic state, dependent upon the measuring frequency, and the reference voltage U2. If this switching branch, connected over coupling condensers 14 and 15, to the input of a frequency marker generator 16, in which a part of the output voltage is fed back over resistance 17 to the input for self-excitation, is connected in parallel therewith, the self-excitation can take place only when a high ohmic resistance is present between the points 10 and 11. This means, however, that the frequency marker generator 16 is unattenuated only at the moment of amplitude equality between U1 and U2. The voltage generated by the frequency marker generator 16, which may be rectified, is uncoupled over an output transformer 18, and, in a manner in itself known, utilized for the generation of a frequency marker in the frequency curve representation at the measuring receivers. For example, the electron beam of a cathode ray tube can be additionally deflected by these voltages or control of the intensity of the electron beam can be effected in dependence on the rectified output voltages. The frequency marker generator 16 thereby oscillates at an arbitrary frequency of sufficient magnitude, whereby the frequency determining oscillatory circuit which, for example, is formed by the parallel connection of a condenser 19 to the primary winding of the output transformer 18, is constructed with relatively low Q for the avoidance of self-oscillations.

A setting of the frequency marker over the width of the scanning frequency represented takes place in a simple manner through adjustment of the amplitude of U2. The calibration of the setting of U2 may be achieved, for example, according to one of the conventional methods of frequency marker generation, in which the wobbled measuring frequency is mixed with a reference frequency and the differential frequency filtered out over a low pass filter. Here it is merely necessary to take care that the wobble speed is sufficiently small. A further possibility consists in manually adjusting the measuring frequency, and on occurrence of a frequency marker according to the frequency mixing process described, readjusting the reference voltage U2 to the necessary value for the generation of the same frequency mark.

If in modification of the construction according to FIG. 2, the switching branch 10, 11 is arranged on the output side of frequency marker generator 16, it is likewise achieved that only at the moment of amplitude equality between U1 and U2 is an output voltage of finite magnitude released for the frequency marker generation.

The switching arrangement according to the invention has the important advantages that a frequency marker of constant width is generated, which is entirely independent of fluctuations of the measuring voltage amplitude and of changes of the wobble speed. It is usable, on the one hand, with very low wobble speeds (scriber connection, manual operation) and, on the other hand, also for very small wobble sweeps (for example, 100 cy./sec), in which case, in consequence of its good frequency response it also allows sufficiently great wobble speeds for evaluation by means of a cathode ray tube. Through the use of an output transformer 18 there exists, moreover, the possibility of superposing the frequency marker impulse, without ground, on any output potential in connection with a cathode ray tube with electrostatic or electromagnetic deflection.

Changes may be made within the scope and spirit of the appended claims which define what is believed to be new and desired to have protected by Letters Patent.

I claim:

1. In a circuit arrangement for the generation of frequency markers in a measuring receiver which contains means for displaying, in two coordinates, the frequency characteristics of an object to be measured, and which is provided with two deflection systems allocated to the respective coordinates for actuation of said display means, means for connecting an output voltage of such an object to one of said deflection systems for influencing the latter, and a first generator having an output voltage which is related in its amplitude to the frequency of the output voltage of the object to be measured, and connected to the second deflection system, the combination of a source of reference voltage with adjustable amplitude, and a voltage comparison circuit having inputs to which are respectively applied the output voltage of said first generator and said reference voltage with adjustable amplitude, said comparison circuit including means for generating, in response to an amplitude equality of said last mentioned voltages, an output impulse which is fed to said display means as a frequency marker impulse.

2. A circuit arrangement according to claim 1, comprising in further combination a signal generator, the output of which is connected to the object to be measured, said signal generator including a frequency regulating branch to which said first generator is connected, the output voltage of said first generator thereby controlling the output frequency of said signal generator.

3. In a circuit arrangement for the generation of frequency markers in a measuring receiver which contains means for displaying, in two coordinates, the frequency characteristics of an object to be measured, and which is provided with two deflection systems allocated to the respective coordinates for actuation of said display means, means for connecting an output voltage of such an object to one of said deflection systems for influencing the latter, a first generator having an output voltage which is related in its amplitude to the frequency of the output voltage of the object to be measured, said first generator being connected to the other of said deflection means, the combination of an alternating voltage generator having a feedback branch for the self-excitation thereof, switching means operatively interposed in said feedback branch for the control thereof, said switching means having one of its terminals connected to the output of said first generator, a reference voltage source operatively connected to another terminal of said switching means, said switching means being operative, upon amplitude equality of the output voltage of said first generator and the reference voltage as applied to said switching means, to operatively close said feedback branch, thereby generating an output impulse which is fed to the display device as a frequency marker impulse.

4. A circuit arrangement according to claim 3, wherein the switching means comprises an anti-parallel circuit having two rectifiers.

5. A circuit arrangement according to claim 3, comprising in further combination, an output transformer, a condenser connected in parallel with the primary winding of said transformer to form an oscillatory circuit which determines the frequency of the output voltage of said alternating current generator.

References Cited

UNITED STATES PATENTS

| | | | |
|---|---|---|---|
| 2,582,608 | 1/1952 | Sherwin | 328—189 |
| 2,610,228 | 9/1952 | Devine | 324—57 XR |
| 2,763,835 | 9/1956 | Lundgren | 324—57 |
| 3,021,522 | 2/1962 | Gleason | 328—181 |
| 3,032,712 | 5/1962 | Hurvitz | 324—77 |
| 3,077,560 | 2/1963 | Langford et al. | 324—57 |

OTHER REFERENCES

Electronics for Scientists, Malmstadt and Enke, W. A. Benjamin, Inc., New York, 1963.

RUDOLPH V. ROLINEC, *Primary Examiner.*

PAUL F. WILLE, *Assistant Examiner.*